(12) United States Patent
Guo et al.

(10) Patent No.: US 12,464,565 B2
(45) Date of Patent: Nov. 4, 2025

(54) TECHNIQUES FOR OPERATION WHEN A SCHEDULED UPLINK TRANSMISSION IS MISALIGNED WITH A FIXED FRAME PERIOD

(71) Applicant: QUALCOMM Incorporated, San Diego, CA (US)

(72) Inventors: Shaozhen Guo, Beijing (CN); Jing Sun, San Diego, CA (US); Changlong Xu, Beijing (CN); Xiaoxia Zhang, San Diego, CA (US); Hao Xu, Beijing (CN); Rajat Prakash, San Diego, CA (US); Luanxia Yang, Beijing (CN); Siyi Chen, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 290 days.

(21) Appl. No.: 18/252,661

(22) PCT Filed: Jan. 28, 2021

(86) PCT No.: PCT/CN2021/074194
§ 371 (c)(1),
(2) Date: May 11, 2023

(87) PCT Pub. No.: WO2022/160192
PCT Pub. Date: Aug. 4, 2022

(65) Prior Publication Data
US 2024/0015791 A1 Jan. 11, 2024

(51) Int. Cl.
*H04W 74/0816* (2024.01)
*H04W 74/00* (2009.01)
*H04W 74/08* (2024.01)

(52) U.S. Cl.
CPC ..... *H04W 74/0816* (2013.01); *H04W 74/006* (2013.01); *H04W 74/0866* (2013.01)

(58) Field of Classification Search
CPC ........... H04W 74/006; H04W 74/0816; H04W 74/0866; H04W 74/0891
See application file for complete search history.

(56) References Cited

U.S. PATENT DOCUMENTS

| | | | |
|---|---|---|---|
| 2020/0037354 A1* | 1/2020 | Li | H04W 74/0808 |
| 2021/0014005 A1* | 1/2021 | Ying | H04L 1/1896 |

(Continued)

FOREIGN PATENT DOCUMENTS

| | | |
|---|---|---|
| CN | 111800887 A | 10/2020 |
| WO | 2020204449 A1 | 10/2020 |
| WO | 2021007369 A1 | 1/2021 |

OTHER PUBLICATIONS

Moderator (Ericsson): "Summary#2 - URLLC/IIoT operation on Unlicensed Band", R1-2101902, 3rd Generation Partnership Project, Mobile Competence Centre, 650, Route Des Lucioles, F-06921 Sophia-antipolis Cedex, France, vol. RAN WG1, No. E-meeting, Jan. 25, 2021-Feb. 5, 2021, Jan. 27, 2021, 50 Pages, XP051975981, the whole document.

(Continued)

*Primary Examiner* — Kashif Siddiqui
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may receive an uplink grant scheduling an uplink transmission that is not aligned with a fixed frame period (FFP) boundary configured for the UE. The UE may receive downlink control information (DCI) including an indication that the UE is to initiate a channel occupancy time (COT) acquisition in association with transmitting the uplink transmission. The UE may modify the indication based at least in part on the uplink transmission not being aligned with the FFP boundary and the indication indicating that the UE is to (Continued)

initiate the COT acquisition. The UE may transmit the uplink transmission based at least in part on the uplink grant and after the modification of the indication. Numerous other aspects are described.

17 Claims, 12 Drawing Sheets

(56) References Cited

U.S. PATENT DOCUMENTS

2022/0159723 A1    5/2022   Jiang
2023/0141989 A1*  5/2023   Bagheri ................... H04L 1/08
                                                                   370/329
2024/0381421 A1* 11/2024  Rosa ..................... H04W 74/02

OTHER PUBLICATIONS

Spreadtrum Communications: "Discussion on enhancements for unlicensed band URLLCIIoT", R1-2100791, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021- Feb. 5, 2021, Jan. 18, 2021, 5 Pages, XP051970528, the whole document.
Supplementary European Search Report—EP21921804—Search Authority—The Hague—Oct. 25, 2024.
International Search Report and Written Opinion—PCT/CN2021/074194—ISA/EPO—Oct. 20, 2021.

* cited by examiner

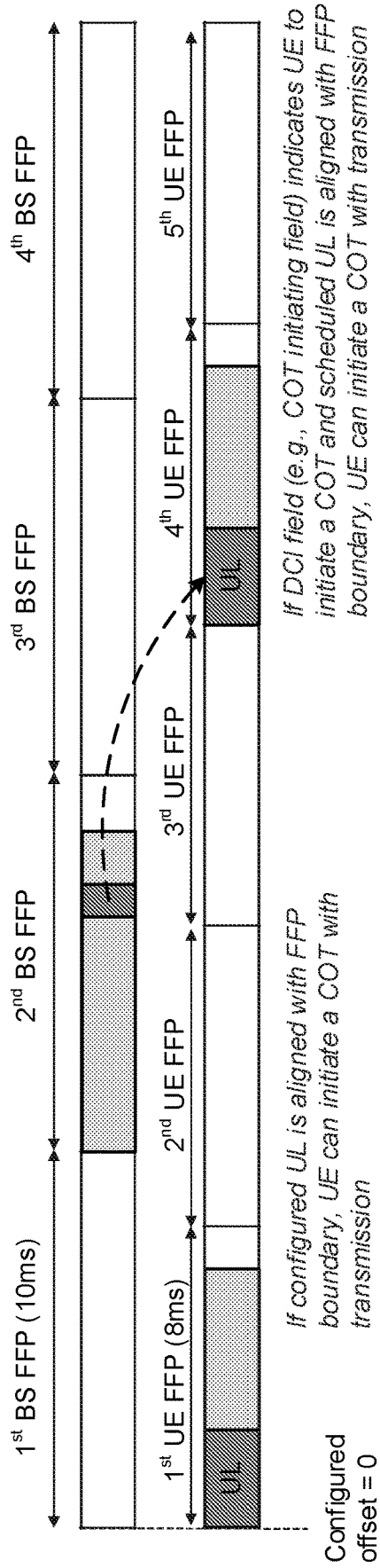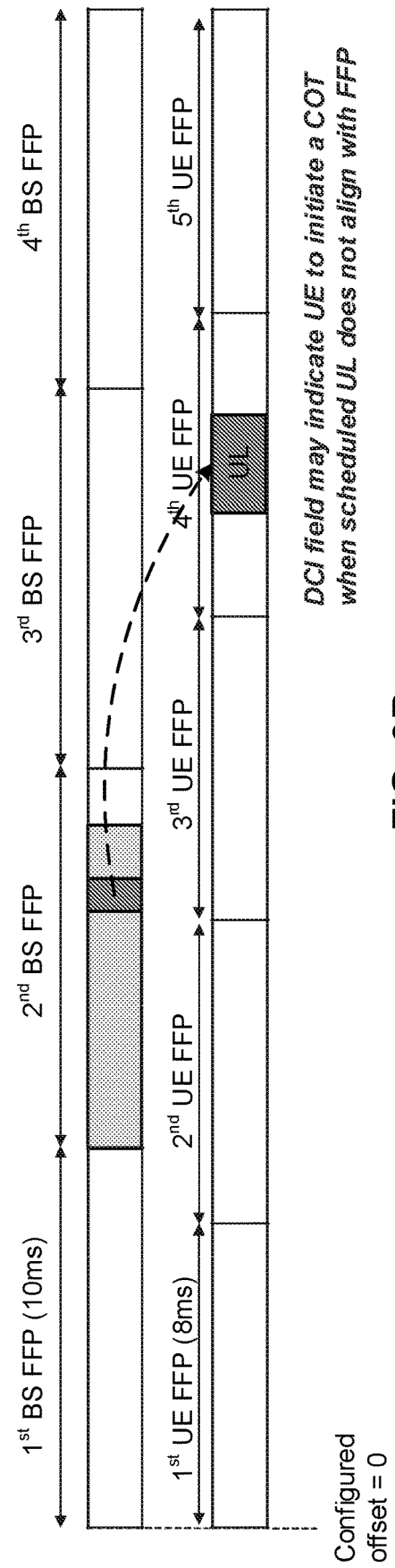
FIG. 3A
FIG. 3B

TECHNIQUES FOR OPERATION WHEN A SCHEDULED UPLINK TRANSMISSION IS MISALIGNED WITH A FIXED FRAME PERIOD

CROSS-REFERENCE TO RELATED APPLICATION

This Patent Application is a 371 National Stage of Patent Cooperation Treaty (PCT) Patent Application No. PCT/CN2021/074194, filed on Jan. 28, 2021, entitled "TECHNIQUES FOR OPERATION WHEN A SCHEDULED UPLINK TRANSMISSION IS MISALIGNED WITH A FIXED FRAME PERIOD," and assigned to the assignee hereof. The disclosure of the prior Application is considered part of and is incorporated by reference into this patent application.

FIELD OF THE DISCLOSURE

Aspects of the present disclosure generally relate to wireless communication and to techniques and apparatuses for operation when a scheduled uplink transmission is misaligned with a fixed frame period (FFP).

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving an uplink grant scheduling an uplink transmission that is not aligned with a fixed frame period (FFP) boundary configured for the UE; receiving downlink control information (DCI) including an indication that the UE is to initiate a channel occupancy time (COT) acquisition in association with transmitting the uplink transmission; modifying the indication based at least in part on the uplink transmission not being aligned with the FFP boundary and the indication indicating that the UE is to initiate the COT acquisition; and transmitting the uplink transmission based at least in part on the uplink grant and after the modification of the indication.

In some aspects, modifying the indication comprises ignoring the indication when the indication is received in a DCI field dedicated to indicating an initiator of the COT acquisition.

In some aspects, the indication is ignored based at least in part on a determination that an amount of time since a configuration of the FFP boundary or a most recent reconfiguration of an FFP offset associated with the FFP boundary is less than a threshold amount of time.

In some aspects, modifying the indication comprises reinterpreting the indication when the indication is encoded in a value of a DCI field used to identify a set of channel access parameters including an initiator of the COT acquisition.

In some aspects, the indication is reinterpreted based at least in part on a determination that an amount of time since a configuration of the FFP boundary or a most recent reconfiguration of an FFP offset associated with the FFP boundary is less than a threshold amount of time.

In some aspects, the method includes performing a listen-before-talk (LBT) procedure prior to the transmission of the uplink transmission.

In some aspects, a method of wireless communication performed by a ULE includes receiving an uplink grant scheduling an uplink transmission that is not aligned with an FFP boundary configured for the UE; receiving DCI including an indication that the UE is to initiate a COT acquisition in association with transmitting the uplink transmission; reconfiguring an FFP offset associated with the FFP boundary based at least in part on the uplink transmission not being aligned with the FFP boundary and the indication indicating that the UE is to initiate the COT acquisition, the FFP offset being reconfigured to cause the FFP boundary to align with the uplink transmission; and initiating the COT acquisition based at least in part on the uplink grant and after the reconfiguration of the FFP offset.

In some aspects, the method includes transmitting the uplink transmission when a result of the COT acquisition is a successful acquisition of a COT.

In some aspects, the FFP offset is reconfigured based at least in part on a determination that an amount of time since a configuration of the FFP boundary or a most recent reconfiguration of the FFP offset is greater than or equal to a threshold amount of time.

In some aspects, the FFP offset is reconfigured based at least in part on a determination that a result of the reconfiguration would cause the FFP offset to be less than a length of an idle period.

In some aspects, a method of wireless communication performed by a UE includes receiving an uplink grant scheduling an uplink transmission that is not aligned with an FFP boundary configured for the UE; receiving DCI including an indication that the UE is to initiate a COT acquisition in association with transmitting the uplink transmission; and ignoring the uplink grant based at least in part on the uplink transmission not being aligned with the FFP boundary and based at least in part on the DCI including the indication that the UE is to initiate the COT acquisition.

In some aspects, a UE for wireless communication includes a memory; and one or more processors coupled to the memory, the memory and the one or more processors configured to: receive an uplink grant scheduling an uplink transmission that is not aligned with an FFP boundary configured for the UE; receive DCI including an indication that the UE is to initiate a COT acquisition in association with transmitting the uplink transmission; modify the indication based at least in part on the uplink transmission not being aligned with the FFP boundary and the indication indicating that the UE is to initiate the COT acquisition; and transmit the uplink transmission based at least in part on the uplink grant and after the modification of the indication.

In some aspects, the one or more processors, when modifying the indication, are configured to ignore the indication when the indication is received in a DCI field dedicated to indicating an initiator of the COT acquisition.

In some aspects, the indication is ignored based at least in part on a determination that an amount of time since a configuration of the FFP boundary or a most recent reconfiguration of an FFP offset associated with the FFP boundary is less than a threshold amount of time.

In some aspects, the one or more processors, when modifying the indication, are configured to reinterpret the indication when the indication is encoded in a value of a DCI field used to identify a set of channel access parameters including an initiator of the COT acquisition.

In some aspects, the indication is reinterpreted based at least in part on a determination that an amount of time since a configuration of the FFP boundary or a most recent reconfiguration of an FFP offset associated with the FFP boundary is less than a threshold amount of time.

In some aspects, the one or more processors are further configured to perform a listen-before-talk (LBT) procedure prior to the transmission of the uplink transmission.

In some aspects, a UE for wireless communication includes a memory; and one or more processors coupled to the memory, the memory and the one or more processors configured to: receive an uplink grant scheduling an uplink transmission that is not aligned with an FFP boundary configured for the UE; receive DCI including an indication that the UE is to initiate a COT acquisition in association with transmitting the uplink transmission; reconfigure an FFP offset associated with the FFP boundary based at least in part on the uplink transmission not being aligned with the FFP boundary and the indication indicating that the UE is to initiate the COT acquisition, the FFP offset being reconfigured to cause the FFP boundary to align with the uplink transmission; and initiate the COT acquisition based at least in part on the uplink grant and after the reconfiguration of the FFP offset.

In some aspects, the one or more processors are further configured to transmit the uplink transmission when a result of the COT acquisition is a successful acquisition of a COT.

In some aspects, the FFP offset is reconfigured based at least in part on a determination that an amount of time since a configuration of the FFP boundary or a most recent reconfiguration of the FFP offset is greater than or equal to a threshold amount of time.

In some aspects, the FFP offset is reconfigured based at least in part on a determination that a result of the reconfiguration would cause the FFP offset to be less than a length of an idle period.

In some aspects, a UE for wireless communication includes a memory; and one or more processors coupled to the memory, the memory and the one or more processors configured to: receive an uplink grant scheduling an uplink transmission that is not aligned with an FFP boundary configured for the UE; receive DCI including an indication that the UE is to initiate a COT acquisition in association with transmitting the uplink transmission; and ignore the uplink grant based at least in part on the uplink transmission not being aligned with the FFP boundary and based at least in part on the DCI including the indication that the UE is to initiate the COT acquisition.

In some aspects, a non-transitory computer-readable medium storing a set of instructions for wireless communication includes one or more instructions that, when executed by one or more processors of a UE, cause the UE to: receive an uplink grant scheduling an uplink transmission that is not aligned with an FFP boundary configured for the UE; receive DCI including an indication that the UE is to initiate a COT acquisition in association with transmitting the uplink transmission; modify the indication based at least in part on the uplink transmission not being aligned with the FFP boundary and the indication indicating that the UE is to initiate the COT acquisition; and transmit the uplink transmission based at least in part on the uplink grant and after the modification of the indication.

In some aspects, the one or more instructions, that cause the UE to modify the indication, cause the UE to ignore the indication when the indication is received in a DCI field dedicated to indicating an initiator of the COT acquisition.

In some aspects, the indication is ignored based at least in part on a determination that an amount of time since a configuration of the FFP boundary or a most recent reconfiguration of an FFP offset associated with the FFP boundary is less than a threshold amount of time.

In some aspects, the one or more instructions, that cause the UE to modify the indication, cause the UE to reinterpret the indication when the indication is encoded in a value of a DCI field used to identify a set of channel access parameters including an initiator of the COT acquisition.

In some aspects, the indication is reinterpreted based at least in part on a determination that an amount of time since a configuration of the FFP boundary or a most recent reconfiguration of an FFP offset associated with the FFP boundary is less than a threshold amount of time.

In some aspects, the one or more instructions further cause the UE to perform a listen-before-talk (LBT) procedure prior to the transmission of the uplink transmission.

In some aspects, a non-transitory computer-readable medium storing a set of instructions for wireless communication includes one or more instructions that, when executed by one or more processors of an UE, cause the UE to:

receive an uplink grant scheduling an uplink transmission that is not aligned with an FFP boundary configured for the UE; receive DCI including an indication that the UE is to initiate a COT acquisition in association with transmitting the uplink transmission; reconfigure an FFP offset associated with the FFP boundary based at least in part on the uplink transmission not being aligned with the FFP boundary and the indication indicating that the UE is to initiate the COT acquisition, the FFP offset being reconfigured to cause the FFP boundary to align with the uplink transmission; and initiate the COT acquisition based at least in part on the uplink grant and after the reconfiguration of the FFP offset.

In some aspects, the one or more instructions further cause the UE to transmit the uplink transmission when a result of the COT acquisition is a successful acquisition of a COT.

In some aspects, the FFP offset is reconfigured based at least in part on a determination that an amount of time since a configuration of the FFP boundary or a most recent reconfiguration of the FFP offset is greater than or equal to a threshold amount of time.

In some aspects, the FFP offset is reconfigured based at least in part on a determination that a result of the reconfiguration would cause the FFP offset to be less than a length of an idle period.

In some aspects, a non-transitory computer-readable medium storing a set of instructions for wireless communication includes one or more instructions that, when executed by one or more processors of an UE, cause the UE to: receive an uplink grant scheduling an uplink transmission that is not aligned with an FFP boundary configured for the UE; receive DCI including an indication that the UE is to initiate a COT acquisition in association with transmitting the uplink transmission; and ignore the uplink grant based at least in part on the uplink transmission not being aligned with the FFP boundary and based at least in part on the DCI including the indication that the UE is to initiate the COT acquisition.

In some aspects, an apparatus for wireless communication includes means for receiving an uplink grant scheduling an uplink transmission that is not aligned with an FFP boundary configured for the UE; means for receiving DCI including an indication that the UE is to initiate a COT acquisition in association with transmitting the uplink transmission; means for modifying the indication based at least in part on the uplink transmission not being aligned with the FFP boundary and the indication indicating that the UE is to initiate the COT acquisition; and means for transmitting the uplink transmission based at least in part on the uplink grant and after the modification of the indication.

In some aspects, the means for modifying the indication comprises means for ignoring the indication when the indication is received in a DCI field dedicated to indicating an initiator of the COT acquisition.

In some aspects, the indication is ignored based at least in part on a determination that an amount of time since a configuration of the FFP boundary or a most recent reconfiguration of an FFP offset associated with the FFP boundary is less than a threshold amount of time.

In some aspects, the means for modifying the indication comprises means for reinterpreting the indication when the indication is encoded in a value of a DCI field used to identify a set of channel access parameters including an initiator of the COT acquisition.

In some aspects, the indication is reinterpreted based at least in part on a determination that an amount of time since a configuration of the FFP boundary or a most recent reconfiguration of an FFP offset associated with the FFP boundary is less than a threshold amount of time.

In some aspects, the apparatus includes means for performing a listen-before-talk (LBT) procedure prior to the transmission of the uplink transmission.

In some aspects, an apparatus for wireless communication includes means for receiving an uplink grant scheduling an uplink transmission that is not aligned with an FFP boundary configured for the UE; means for receiving DCI including an indication that the UE is to initiate a COT acquisition in association with transmitting the uplink transmission; means for reconfiguring an FFP offset associated with the FFP boundary based at least in part on the uplink transmission not being aligned with the FFP boundary and the indication indicating that the UE is to initiate the COT acquisition, the FFP offset being reconfigured to cause the FFP boundary to align with the uplink transmission; and means for initiating the COT acquisition based at least in part on the uplink grant and after the reconfiguration of the FFP offset.

In some aspects, the apparatus includes means for transmitting the uplink transmission when a result of the COT acquisition is a successful acquisition of a COT.

In some aspects, the FFP offset is reconfigured based at least in part on a determination that an amount of time since a configuration of the FFP boundary or a most recent reconfiguration of the FFP offset is greater than or equal to a threshold amount of time.

In some aspects, the FFP offset is reconfigured based at least in part on a determination that a result of the reconfiguration would cause the FFP offset to be less than a length of an idle period.

In some aspects, an apparatus for wireless communication includes means for receiving an uplink grant scheduling an uplink transmission that is not aligned with an FFP boundary configured for the UE; means for receiving DCI including an indication that the UE is to initiate a COT acquisition in association with transmitting the uplink transmission; and means for ignoring the uplink grant based at least in part on the uplink transmission not being aligned with the FFP boundary and based at least in part on the DCI including the indication that the UE is to initiate the COT acquisition.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3A and 3B are diagrams illustrating examples associated with uplink transmissions in relation to fixed frame period (FFP) boundaries, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
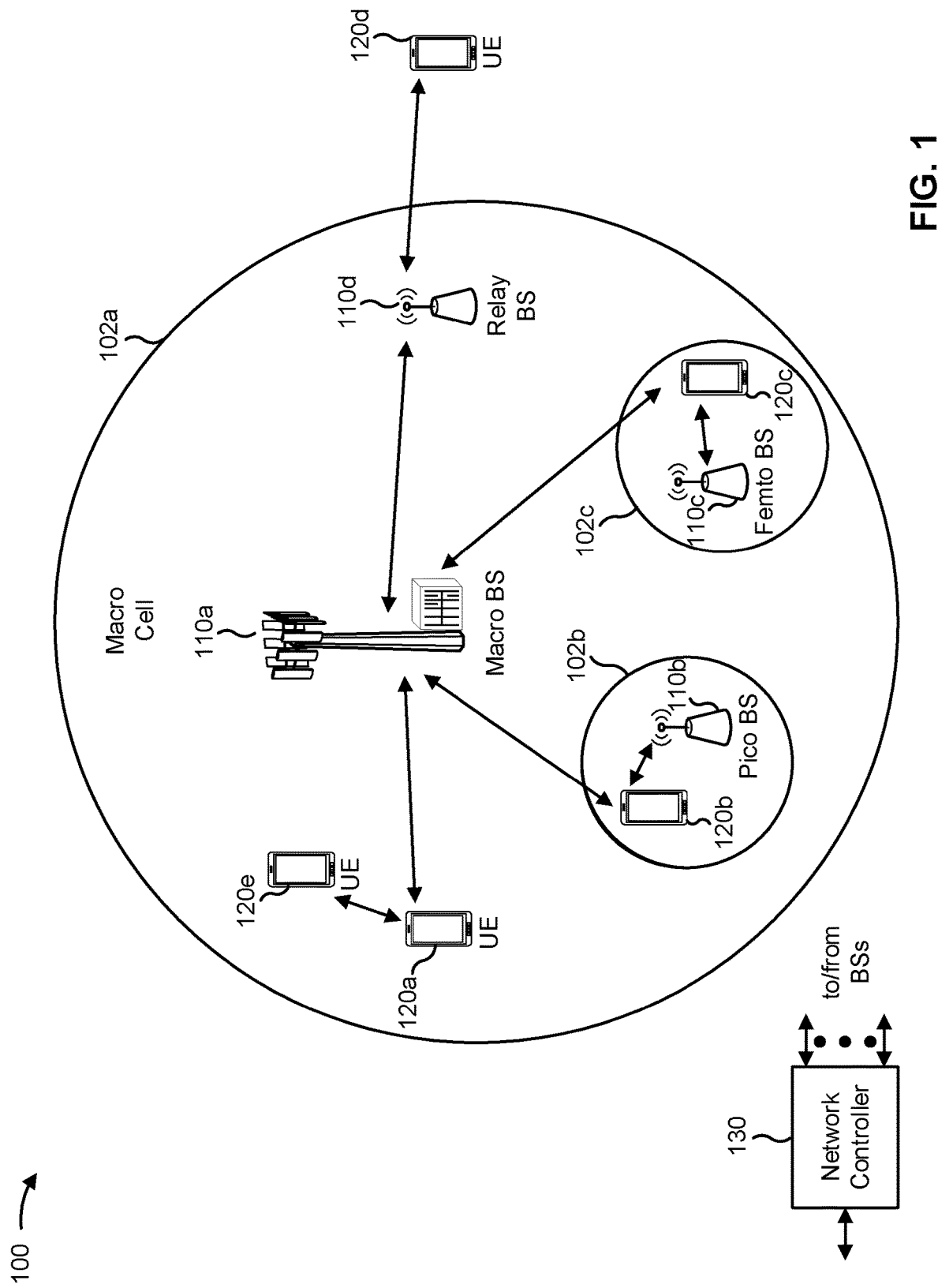
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
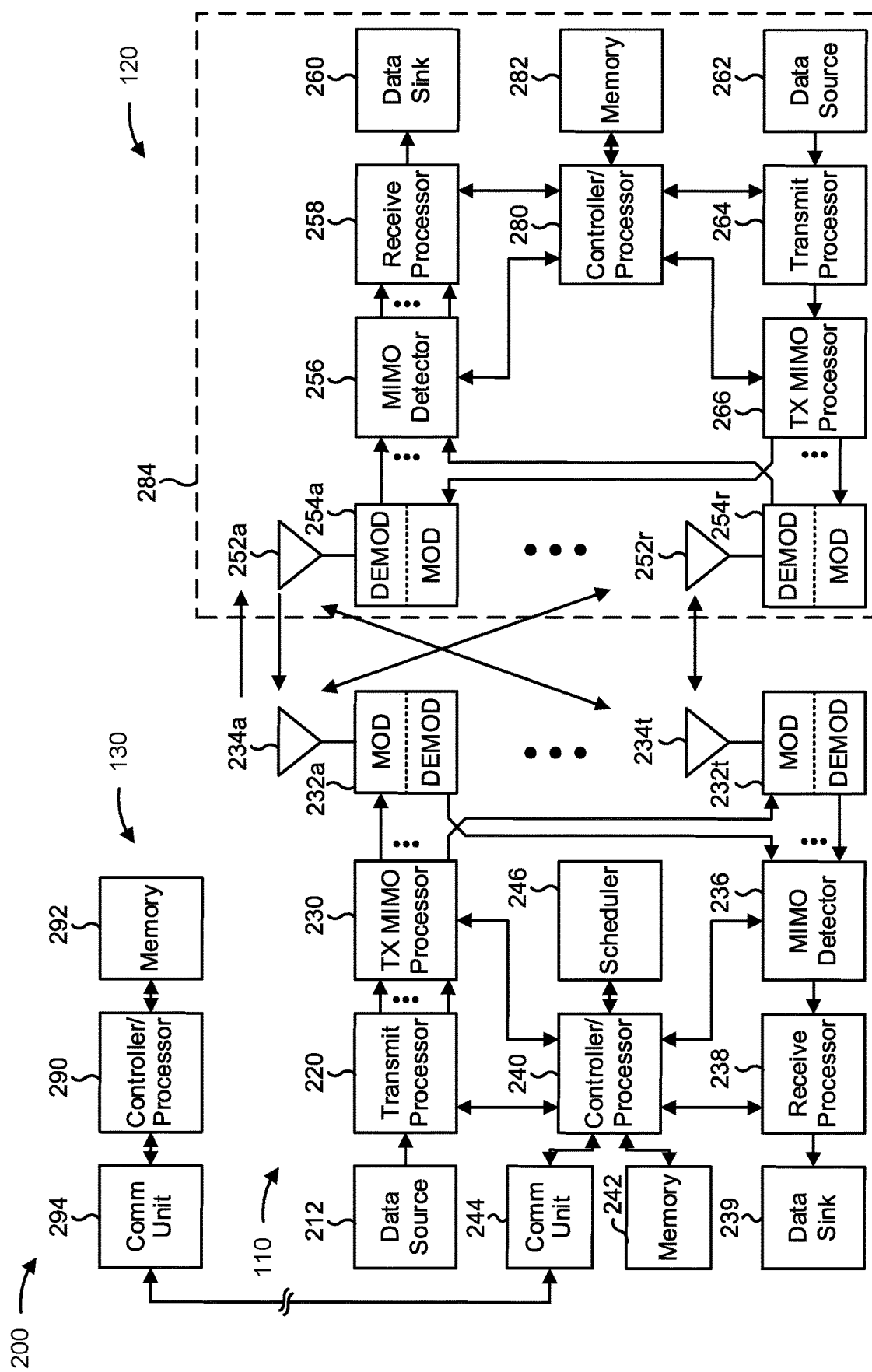
FIG. 2 is a diagram illustrating an example of a base station in communication with a user equipment (UE) in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream.

Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM) and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with operation when a scheduled uplink transmission is misaligned with an FFP, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, process 900 of FIG. 9, and/or other processes as described herein. In some aspects, executing instructions may include running the instructions, converting the instructions, compiling the instructions, and/or interpreting the instructions.

In some aspects, a UE (e.g., UE 120) includes means for receiving an uplink grant scheduling an uplink transmission that is not aligned with an FFP boundary configured for the UE; means for receiving DCI including an indication that the UE is to initiate a COT acquisition in association with transmitting the uplink transmission; means for modifying the indication based at least in part on the uplink transmission not being aligned with the FFP boundary and the indication indicating that the UE is to initiate the COT acquisition; or means for transmitting the uplink transmission based at least in part on the uplink grant and after the modification of the indication. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for performing a listen-before-talk (LBT) procedure prior to the transmission of the uplink transmission.

In some aspects, a UE (e.g., UE 120) includes means for receiving an uplink grant scheduling an uplink transmission that is not aligned with an FFP boundary configured for the UE; means for receiving DCI including an indication that the UE is to initiate a COT acquisition in association with transmitting the uplink transmission; means for reconfiguring an FFP offset associated with the FFP boundary based at least in part on the uplink transmission not being aligned with the FFP boundary and the indication indicating that the UE is to initiate the COT acquisition, the FFP offset being reconfigured to cause the FFP boundary to align with the uplink transmission; or means for initiating the COT acquisition based at least in part on the uplink grant and after the reconfiguration of the FFP offset. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for transmitting the uplink transmission when a result of the COT acquisition is a successful acquisition of a COT.

In some aspects, a UE (e.g., UE 120) includes means for receiving an uplink grant scheduling an uplink transmission that is not aligned with an FFP boundary configured for the UE; means for receiving DCI including an indication that the UE is to initiate a COT acquisition in association with transmitting the uplink transmission; or means for ignoring the uplink grant based at least in part on the uplink transmission not being aligned with the FFP boundary and based at least in part on the DCI including the indication that the UE is to initiate the COT acquisition. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

As indicated above, FIG. 2 is provided as an example. Other examples may differ from what is described with regard to FIG. 2.

A wireless communication device (e.g., a UE 120 or a base station 110, among other examples) may be capable of operating in a semi-static channel access mode that permits the wireless communication device to attempt to utilize radio resources (e.g., radio resources in an unlicensed or shared spectrum) needed for transmitting or receiving communications. In the context of the semi-static channel access mode, a wireless communication device that initiates a channel occupancy time (COT) acquisition associated with occupying radio resources (sometimes referred to as an initiating device) is associated with a single fixed frame period (FFP). The FFP is used for initiating channel occupancy purposes and is defined by an FFP period and, in the case of a UE, an FFP offset (e.g., relative to timing associated with the base station). Notably, configuration of the FFP may in some cases be limited (e.g., such that the FFP is not reconfigured for at least 200 milliseconds (ms) after configuration).

When operating in the semi-static channel access mode, a UE needs to be capable of determining whether a scheduled uplink transmission is to be transmitted according to a shared base station COT (e.g., a COT initiated by the base station and shared by one or more UEs) or a UE-initiated COT (e.g., a COT initiated by the UE). In some cases, a UE may be configured to identify the initiator of the COT based on a value in a downlink control information (DCI) field (e.g., a field dedicated to indicating the initiator of the COT or a field used to indicate a set of channel access parameters including the indicator of the COT, such as a ChannelAccess-CPext field) associated with the scheduled uplink transmission. Notably, a scheduled uplink transmission cannot be transmitted according to both a shared base station COT and UE-initiated COT.

In practice, a base station can configure a single FFP period and offset to a UE (e.g., via radio resource control (RRC) signaling). In operation, as shown in the left portion of FIG. 3A, if a configured uplink transmission (e.g., an RRC configured uplink transmission) aligns with a FFP boundary defined by the configured FFP period and FFP offset, then the UE can initiate a COT with the uplink transmission and transmit the uplink transmission accordingly (e.g., when the UE successfully acquires the channel).

With respect to a scheduled uplink transmission (rather than a configured uplink transmission), a base station can use DCI associated with a scheduling grant to trigger the UE to initiate a COT for the uplink transmission. Here, as shown in the right portion of FIG. 3A, if a scheduled uplink transmission aligns with an FFP boundary defined by the configured FFP period and FFP offset, then the UE can initiate a COT with the scheduled uplink transmission. However, reconfiguration of the FFP boundary (e.g., adjustment of the FFP offset) in a dynamic manner is not supported. Thus, because the base station can set any uplink grant to cause the UE to initiate a COT, it is possible for the base station to provide DCI indicating that the UE is to initiate a COT while scheduling an uplink transmission that is not aligned with the FFP boundary (e.g., an uplink transmission that is not scheduled to start at a beginning of an FFP period). An example of such a scenario is shown in FIG. 3B. In such a scenario, the UE needs to be configured to resolve the ambiguity arising due to the DCI indicating a UE-initiated COT for an uplink transmission that is not aligned with an FFP boundary.

Some aspects described provide techniques for operation when a scheduled uplink transmission is misaligned with an FFP. In some aspects, a UE may receive an uplink grant scheduling an uplink transmission that is not aligned with an FFP boundary configured for the UE. The UE may further receive DCI including an indication that the UE is to initiate a COT acquisition in association with transmitting the uplink transmission. In some aspects, the UE may modify the indication based at least in part on the uplink transmission not being aligned with the FFP boundary and the indication indicating that the UE is to initiate the COT acquisition, and may transmit the uplink transmission based at least in part on the uplink grant and after the modification of the indication. Alternatively, in some aspects, the UE may reconfigure an FFP offset associated with the FFP boundary based at least in part on the uplink transmission not being aligned with the FFP boundary and the indication indicating that the UE is to initiate the COT acquisition, and may initiate the COT acquisition based at least in part on the uplink grant and after the reconfiguration of the FFP offset. Alternatively, in some aspects, the UE may ignore the uplink grant based at least in part on the uplink transmission not being aligned with the FFP boundary and based at least in part on the DCI including the indication that the UE is to initiate the COT acquisition. Additional details of these various techniques are provided below.

Figure 4:
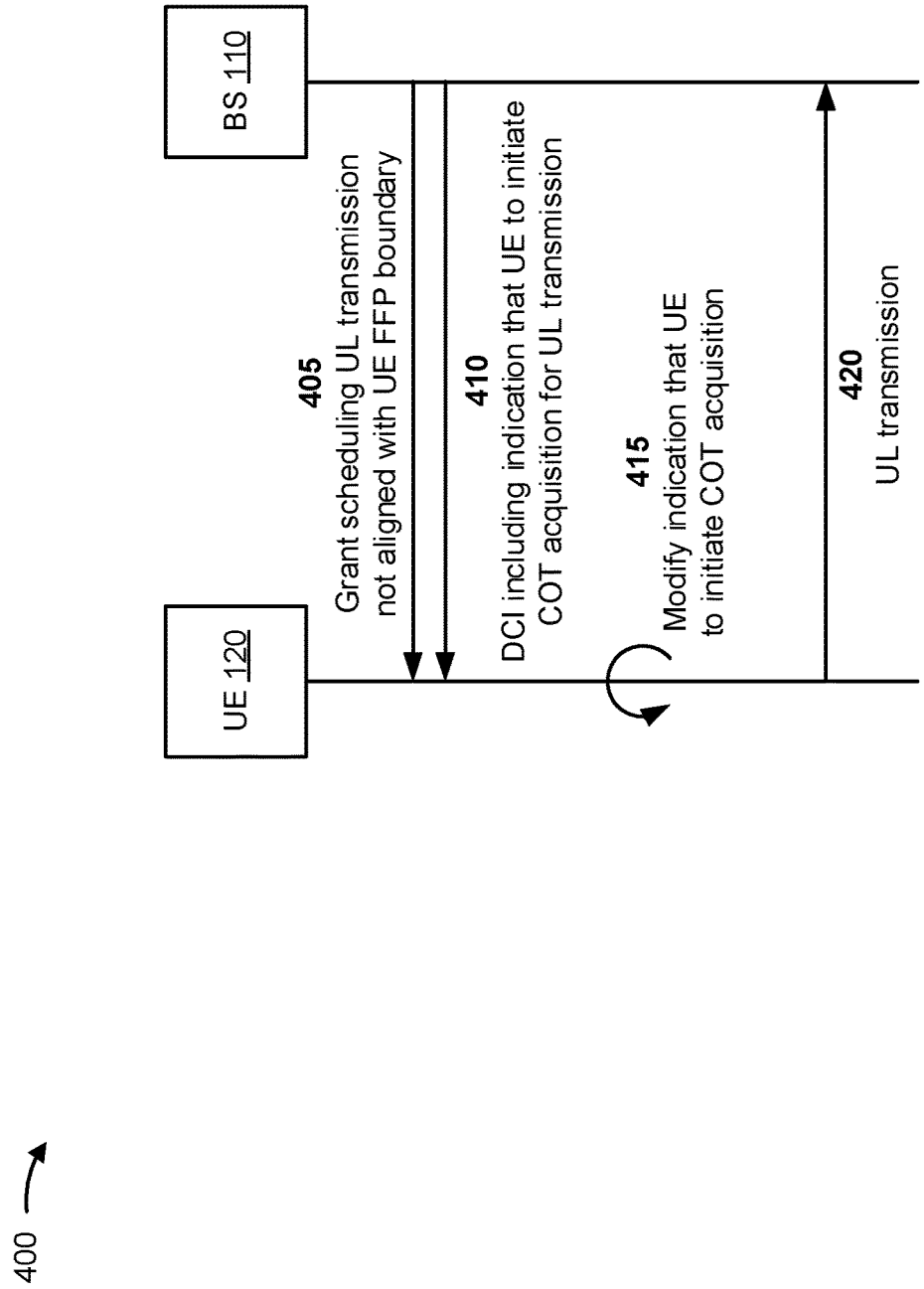
FIGS. 4, 5A, 5B, and 6 are diagrams illustrating examples associated with operation when a scheduled uplink transmission is misaligned with a UE FFP, in accordance with various aspects of the present disclosure.

FIG. 4 is a diagram illustrating an example 400 associated with modifying an indication based at least in part on an uplink transmission not being aligned with an FFP boundary and the indication indicating that a UE is to initiate a COT acquisition, in accordance with various aspects of the present disclosure. As shown in FIG. 4, a base station 110 and a UE 120 may communicate with one another.

As show by reference 405, the UE may receive (e.g., from the base station) an uplink grant scheduling an uplink transmission that is not aligned with an FFP boundary configured for the UE.

In some aspects, the UE may determine that the uplink transmission is not aligned with an FFP boundary configured for the UE. For example, the base station may configure the UE with an FFP period and an FFP offset that define the FFP boundary. Here, the UE may receive the uplink grant and may identify a set of resources in which the UE is to transmit an uplink transmission based at least in part on the uplink grant. The TIE may then determine based at least in part on the configured FFP boundary and the identified set of resources to be used for the uplink transmission, that the uplink transmission is not aligned with the FFP boundary. That is, the UE may determine that a first symbol of the identified set of resources to be used for the uplink transmission is not a first symbol of an upcoming FFP period.

As shown by reference 410, the UE may receive DCI including an indication that the UE is to initiate a COT acquisition in association with transmitting the uplink transmission. In some aspects, the DCI may be included in the uplink grant, may be received concurrent with the uplink grant, or may be received at a time different than that at which the uplink grant is received.

In some aspects, the indication may be carried in a value in a DCI field. For example, the indication may be carried in a value in a DCI field dedicated to indicating the initiator of the COT. As another example, the indication may be carried in a value in a DCI field used to indicate a set of channel access parameters including the indicator of the COT, such as a ChannelAccess-CPext field.

As shown by reference 415, the UE may modify the indication based at least in part on the uplink transmission not being aligned with the FFP boundary and the indication indicating that the UE is to initiate the COT acquisition. For example, the UE may determine that the uplink transmission is not aligned with the FFP boundary and may determine that the DCI indicates the UE as the COT initiator associated with transmitting the uplink transmission. The UE may then modify the indication based at least in part on these determinations.

In some aspects, modifying the indication may include ignoring the indication. For example, when the indication is received in a DCI field dedicated to indicating an initiator of the COT acquisition, the UE may ignore the indication. In such an aspect, ignoring the indication may cause the UE to fall back to an assumption that the uplink transmission is to be transmitted using a shared base station COT.

In some aspects, the UE may be configured to ignore the indication when an amount of time since a configuration of the FFP boundary or a most recent reconfiguration of an FFP offset associated with the FFP boundary is less than a threshold amount of time. For example, the UE may receive the indication that the UE is to initiate the COT and may determine an amount of time since the FFP boundary was configured or, in case the FFP offset has been reconfigured, an amount of time since the FFP offset was reconfigured. Here, if the amount of time since the configuration of the FFP boundary or the most recent reconfiguration of an FFP offset is less than a threshold amount of time, such as 200 ms, then the UE may ignore the indication. Conversely, if the amount of time since the configuration of the FFP boundary or the most recent reconfiguration of an FFP offset is greater than or equal to the threshold amount of time, then the UE may reconfigure the FFP offset and initiate the COT acquisition (e.g., in a manner similar to that described with respect to FIGS. 5A and 5B).

In some aspects, modifying the indication may include reinterpreting the indication. For example, when the indication is encoded in a value of a DCI field used to identify a set of channel access parameters including an initiator of the COT acquisition, the UE may reinterpret the indication. In such an aspect, reinterpreting the indication may cause the UE to fall back to an assumption that the uplink transmission is to be transmitted using a shared base station COT.

In some aspects, the UE may be configured to reinterpret the indication when an amount of time since a configuration of the FFP boundary or a most recent reconfiguration of an FFP offset associated with the FFP boundary is less than a threshold amount of time. For example, the UE may receive the indication that the UE is to initiate the COT, and may determine an amount of time since the FFP boundary was configured or, in case the FFP offset has been reconfigured, an amount of time since the FFP offset was reconfigured. Here, if the amount of time since the configuration of the FFP boundary or the most recent reconfiguration of an FFP offset is less than a threshold amount of time, such as 200 ms, then the UE may reinterpret the indication. Conversely, if the amount of time since the configuration of the FFP boundary or the most recent reconfiguration of an FFP offset is greater than or equal to the threshold amount of time, then the UE may reconfigure the FFP offset and initiate the COT acquisition (e.g., in a manner similar to that described with respect to FIGS. 5A and 5B).

As shown by reference 420, the UE may transmit the uplink transmission based at least in part on the uplink grant and after the modification of the indication. For example, the UE may modify (e.g., ignore or reinterpret) the indication (e.g., such that the UE falls back to an assumption of a shared base station COT) and may transmit the uplink transmission in the set of resources identified by the uplink grant.

In some aspects, the UE may perform a listen-before-talk (LBT) procedure prior to the transmission of the uplink transmission (e.g., when the UE is configured or otherwise indicated to perform the LBT procedure prior to transmitting the uplink transmission). Conversely, in some aspects, the UE may transmit the uplink transmission without performing an LBT procedure.

As indicated above, FIG. 4 is provided as an example. Other examples may differ from what is described with respect to FIG. 4.

Figure 5A:
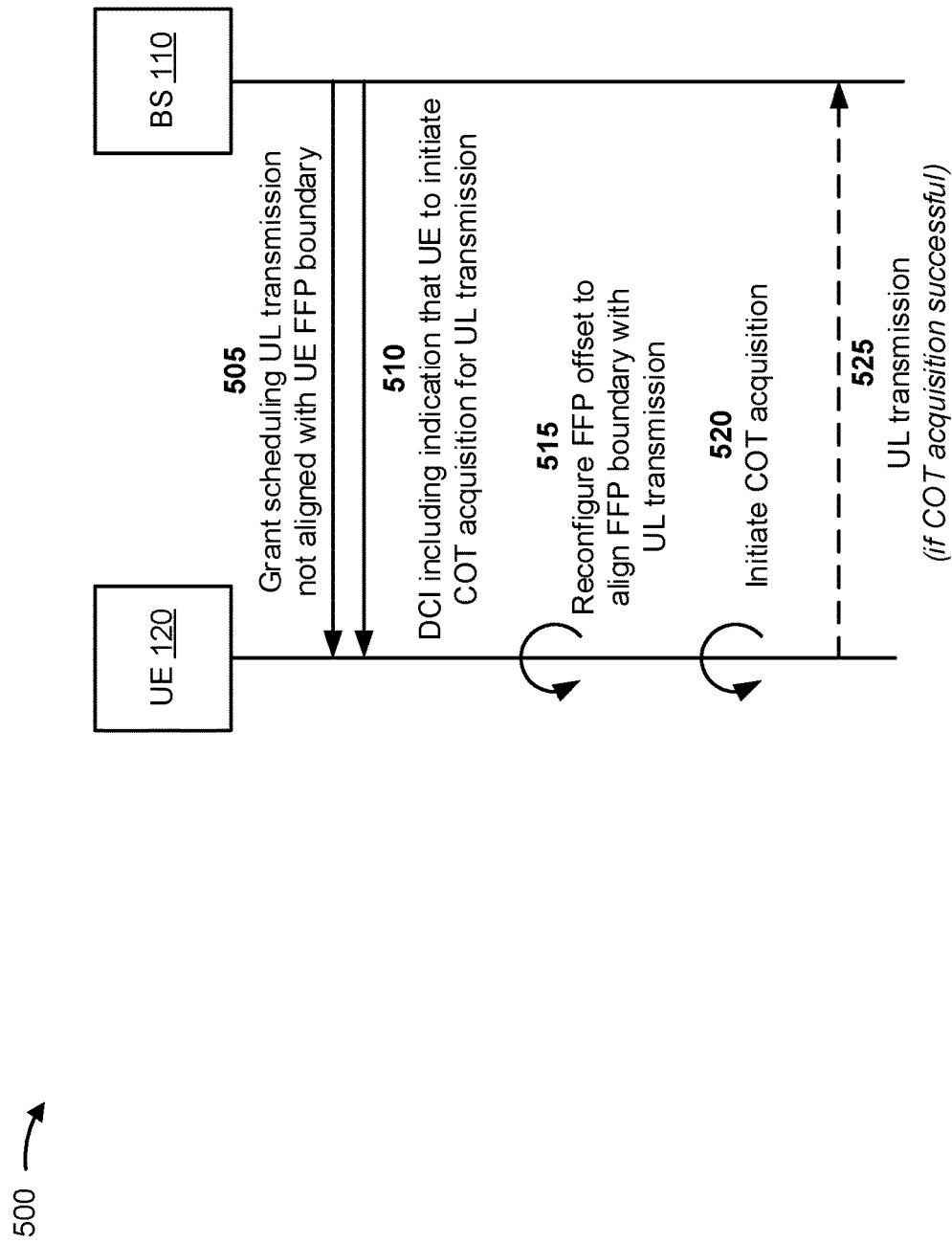
Figure 5B:
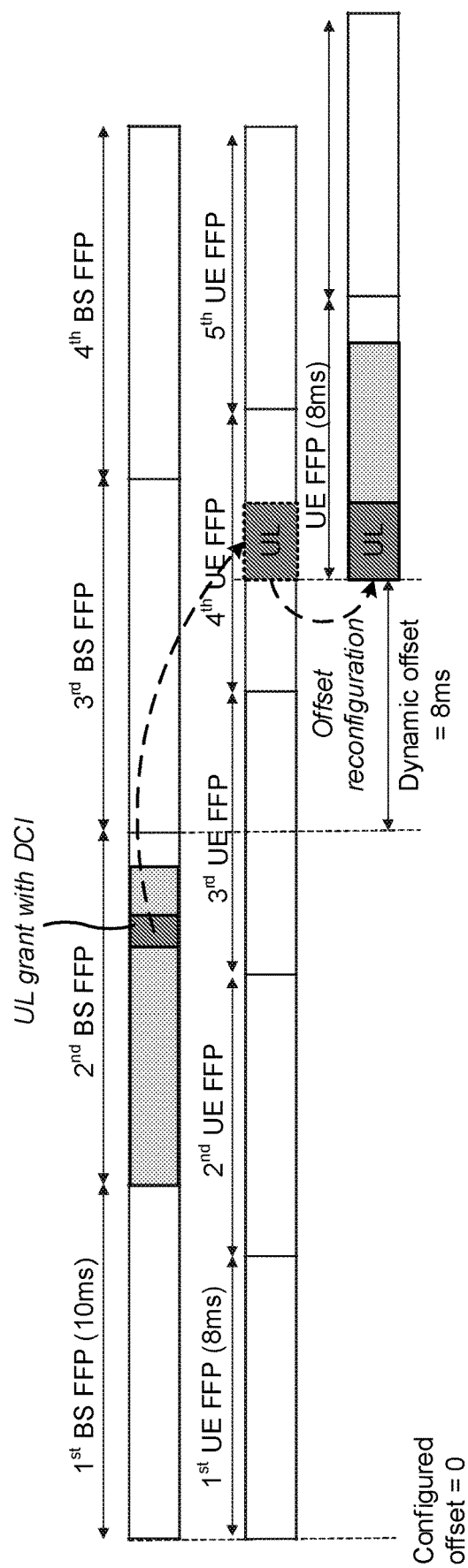

FIGS. 5A and 5B are diagrams illustrating an example 500 associated with reconfiguring an FFP offset associated with an FFP boundary based at least in part on an uplink transmission not being aligned with the FFP boundary and an indication indicating that a UE is to initiate a COT acquisition, in accordance with various aspects of the present disclosure. As shown in FIG. 5A, a base station 110 and a UE 120 may communicate with one another.

As show by reference 505, the UE may receive (e.g., from the base station) an uplink grant scheduling an uplink transmission that is not aligned with an FFP boundary configured for the UE. In some aspects, the UE may receive and process the uplink grant in a manner similar to that described above in association with FIG. 4.

As shown by reference 510, the UE may receive DCI including an indication that the UE is to initiate a COT acquisition in association with transmitting the uplink transmission. In some aspects, the UE may receive and process the DCI in a manner similar to that described above in association with FIG. 4.

As shown by reference 515, the UE may reconfigure an FFP offset associated with the FFP boundary based at least in part on the uplink transmission not being aligned with the FFP boundary and the indication indicating that the UE is to initiate the COT acquisition. In some aspects, the UE may reconfigure the FFP offset in such a way so as to cause the FFP boundary to align with the uplink transmission.

FIG. 5B illustrates a particular example associated with such a reconfiguration of the FFP offset. In FIG. 5B, the UE receives (e.g., from the base station during a second base station FFP period), an uplink grant scheduling an uplink transmission that is not aligned with an FFP boundary. In the example shown in FIG. 5B, the uplink transmission is scheduled to start near a middle of a fourth UE FFP period. Further, in this example, DCI associated with the uplink grant includes an indication that the UE is to initiate a COT acquisition with the uplink transmission. As shown in FIG. 5B, based at least in part on the uplink transmission not being aligned with the FFP boundary and the indication indicating that the UE is to initiate the COT acquisition, the UE may reconfigure the FFP offset such that an upcoming UE FFP period (e.g., after reconfiguration of the FFP offset) aligns with the scheduled uplink transmission. In this way, the FFP offset is dynamically reconfigured (e.g., an 8 ms dynamic offset is indicated in FIG. 5B). In this scenario, the UE replaces the configured FFP offset with the dynamic offset. Further, in future FFP periods, the UE will use the reconfigured offset for COT initiating. Notably, the FFP period may remain unchanged in such a scenario.

In some aspects, the UE may be configured to reconfigure the FFP offset when an amount of time since a configuration of the FFP boundary or a most recent reconfiguration of the FFP offset is greater than or equal to a threshold amount of time. For example, the UE may receive the indication that the UE is to initiate the COT, and may determine an amount of time since the FFP boundary was configured or, in case the FFP offset has been reconfigured, an amount of time since the FFP offset was reconfigured. Here, if the amount of time since the configuration of the FFP boundary or the most recent reconfiguration of an FFP offset is greater than or equal to a threshold amount of time, such as 200 ms, then the UE may reconfigure the FFP offset. Conversely, if the amount of time since the configuration of the FFP boundary or the most recent reconfiguration of an FFP offset is greater than or equal to the threshold amount of time, then the UE may modify the indication (e.g., in a manner similar to that described with respect to FIG. 4).

In some aspects, the ULE may reconfigure the FFP offset based at least in part on a determination that a result of the reconfiguration would cause the FFP offset to be less than a length of an idle period. That is, when the FFP offset resulting from the reconfiguration would be less than an idle period length, the UE may reconfigure the FFP offset.

Returning to FIG. 5A, as shown by reference 520, the UE may initiate the COT acquisition based at least in part on the uplink grant and after the reconfiguration of the FFP offset. For example, the UE may reconfigure the FFP offset, and may then initiate the COT acquisition such that the UE can transmit the uplink grant according to the uplink grant and the reconfigured FFP offset.

As shown by reference 525, the UE may in some aspects transmit the uplink transmission when a result of the COT acquisition is a successful acquisition of a COT.

As indicated above, FIGS. 5A and 5B are provided as examples. Other examples may differ from what is described with respect to FIGS. 5a and 5B.

Figure 6:
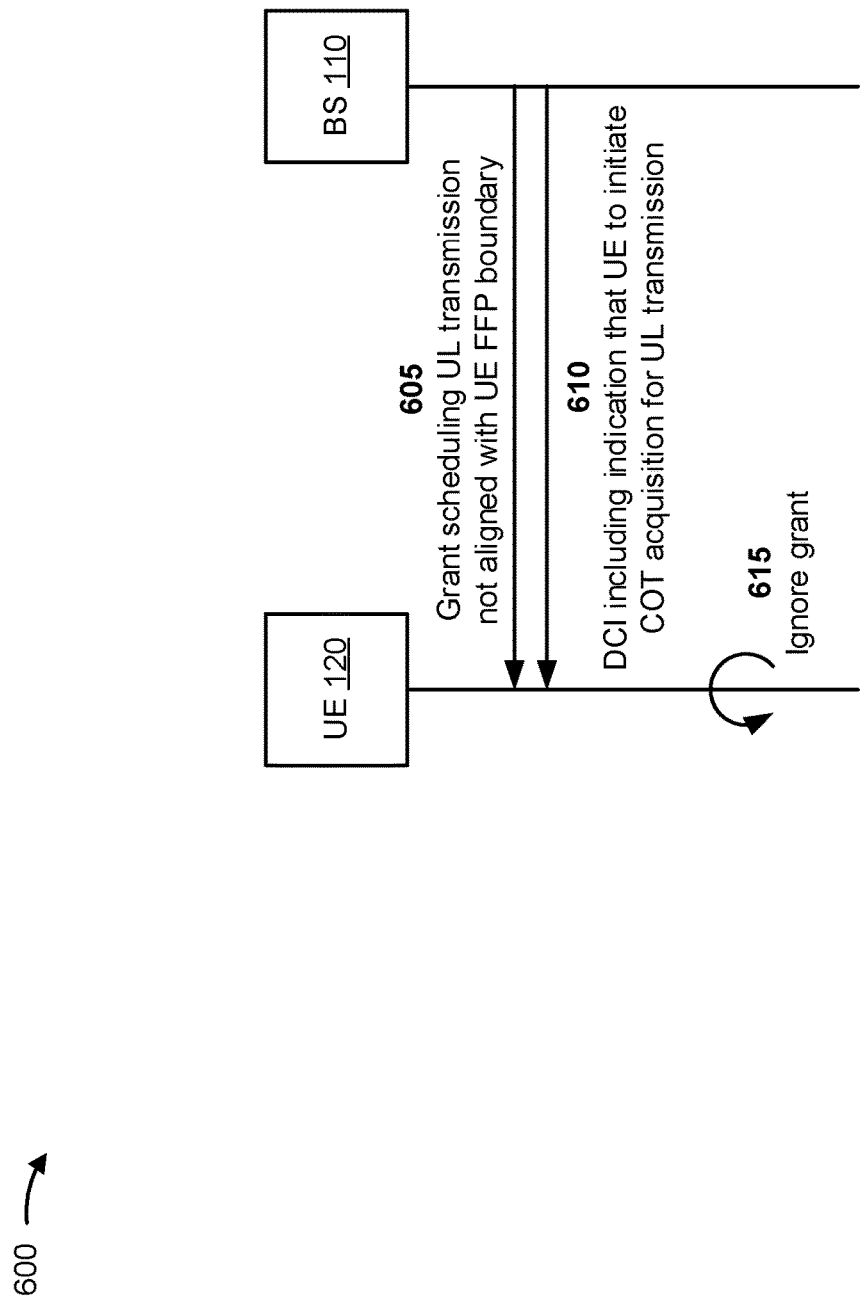

FIG. 6 is a diagram illustrating an example 600 associated with ignoring an uplink grant based at least in part on an uplink transmission not being aligned with an FFP boundary and based at least in part on DCI including an indication that a UE is to initiate a COT acquisition, in accordance with various aspects of the present disclosure. As shown in FIG. 6, a base station 110 and a UE 120 may communicate with one another.

As show by reference 605, the UE may receive (e.g., from the base station) an uplink grant scheduling an uplink transmission that is not aligned with an FFP boundary configured for the UE. In some aspects, the UE may receive and process the uplink grant in a manner similar to that described above in association with FIG. 4.

As shown by reference 610, the UE may receive DCI including an indication that the UE is to initiate a COT acquisition in association with transmitting the uplink transmission. In some aspects, the UE may receive and process the DCI in a manner similar to that described above in association with FIG. 4.

As shown by reference 615, the UE may ignore the uplink grant based at least in part on the uplink transmission not being aligned with the FFP boundary and based at least in part on the DCI including the indication that the UE is to initiate the COT acquisition. That is, in some aspects, the UE may be configured to treat such a case as an error case, meaning that the UE does not expect to receive an uplink grant that schedules uplink transmission not aligned with the FFP boundary and that indicates that the UE is to initiate a COT acquisition. In such a case, the UE may ignore the uplink grant and may not transmit the uplink transmission)

As indicated above, FIG. 6 is provided as an example. Other examples may differ from what is described with respect to FIG. 6.

Figure 7:
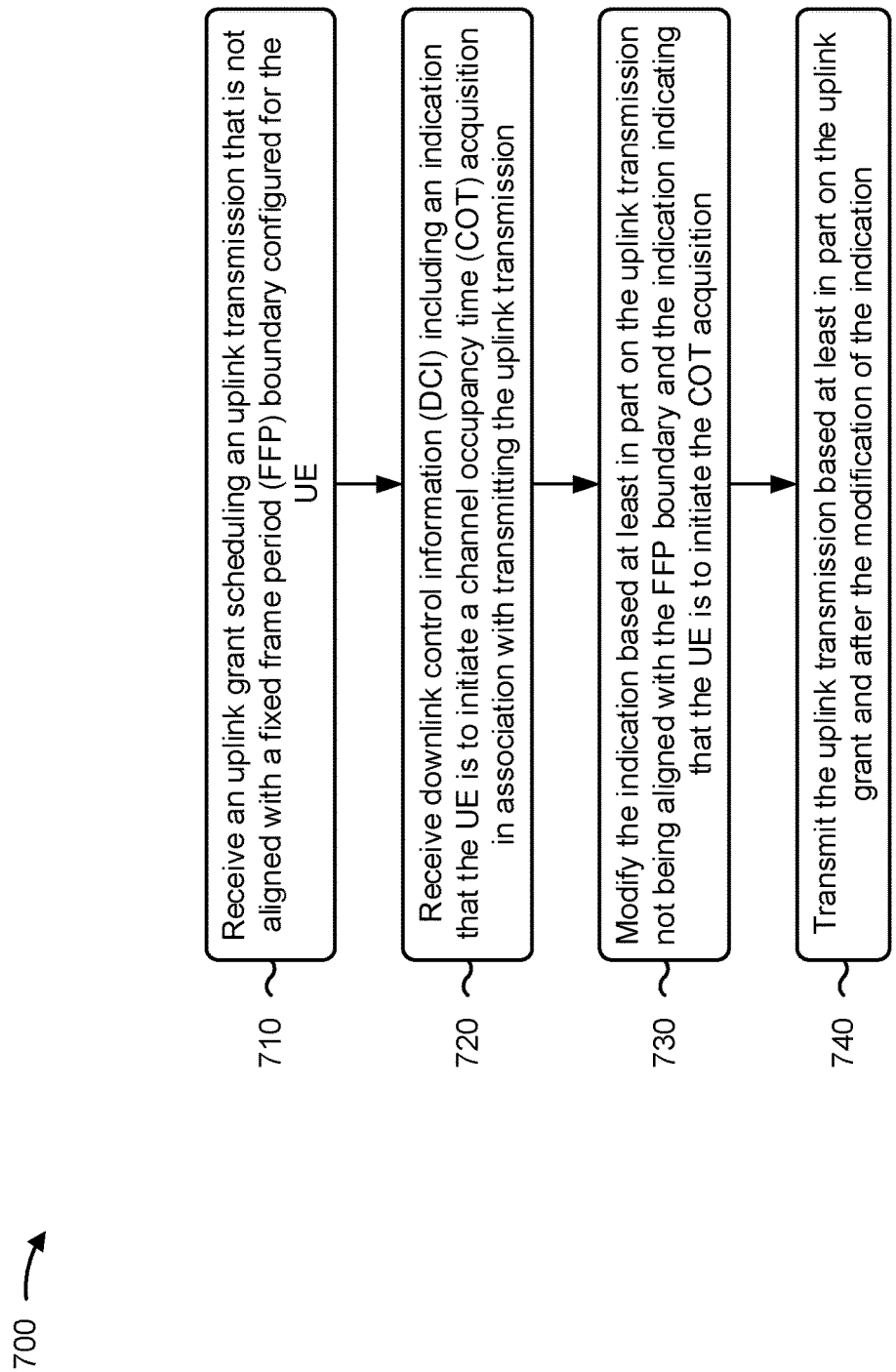
FIGS. 7-9 are diagrams illustrating example processes associated with operation when a scheduled uplink transmission is misaligned with a UE FFP, in accordance with various aspects of the present disclosure.

FIG. 7 is a diagram illustrating an example process 700 performed, for example, by a UE, in accordance with various aspects of the present disclosure. Example process 700 is an example where the UE (e.g., UE 120) performs operations associated with techniques for operation when a scheduled uplink transmission is misaligned with a fixed frame period.

As shown in FIG. 7, in some aspects, process 700 may include receiving an uplink grant scheduling an uplink transmission that is not aligned with an FFP boundary configured for the UE (block 710). For example, the UE (e.g., using reception component 1002, depicted in FIG. 10) may receive an uplink grant scheduling an uplink transmission that is not aligned with an FFP boundary configured for the UE, as described above.

As further shown in FIG. 7, in some aspects, process 700 may include receiving DCI including an indication that the UE is to initiate a COT acquisition in association with transmitting the uplink transmission (block 720). For example, the UE (e.g., using reception component 1002, depicted in FIG. 10) may receive DCI including an indication that the UE is to initiate a COT acquisition in association with transmitting the uplink transmission, as described above.

As further shown in FIG. 7, in some aspects, process 700 may include modifying the indication based at least in part on the uplink transmission not being aligned with the FFP boundary and the indication indicating that the UE is to initiate the COT acquisition (block 730). For example, the UE (e.g., using grant processing component 1008, depicted in FIG. 10) may modify the indication based at least in part on the uplink transmission not being aligned with the FFP boundary and the indication indicating that the UE is to initiate the COT acquisition, as described above.

As further shown in FIG. 7, in some aspects, process 700 may include transmitting the uplink transmission based at least in part on the uplink grant and after the modification of the indication (block 740). For example, the UE (e.g., using transmission component 1004 depicted in FIG. 10) may transmit the uplink transmission based at least in part on the uplink grant and after the modification of the indication, as described above.

Process 700 may include additional aspects, such as any single aspect or any combination of aspects described below and/or in connection with one or more other processes described elsewhere herein.

In a first aspect, modifying the indication comprises ignoring the indication when the indication is received in a DCI field dedicated to indicating an initiator of the COT acquisition.

In a second aspect, alone or in combination with the first aspect, the indication is ignored based at least in part on a determination that an amount of time since a configuration of the FFP boundary or a most recent reconfiguration of an FFP offset associated with the FFP boundary is less than a threshold amount of time.

In a third aspect, alone or in combination with one or more of the first and second aspects, modifying the indication comprises reinterpreting the indication when the indication is encoded in a value of a DCI field used to identify a set of channel access parameters including an initiator of the COT acquisition.

In a fourth aspect, alone or in combination with one or more of the first through third aspects, the indication is reinterpreted based at least in part on a determination that an amount of time since a configuration of the FFP boundary or a most recent reconfiguration of an FFP offset associated with the FFP boundary is less than a threshold amount of time.

In a fifth aspect, alone or in combination with one or more of the first through fourth aspects, process 700 includes performing an LBT procedure prior to the transmission of the uplink transmission.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
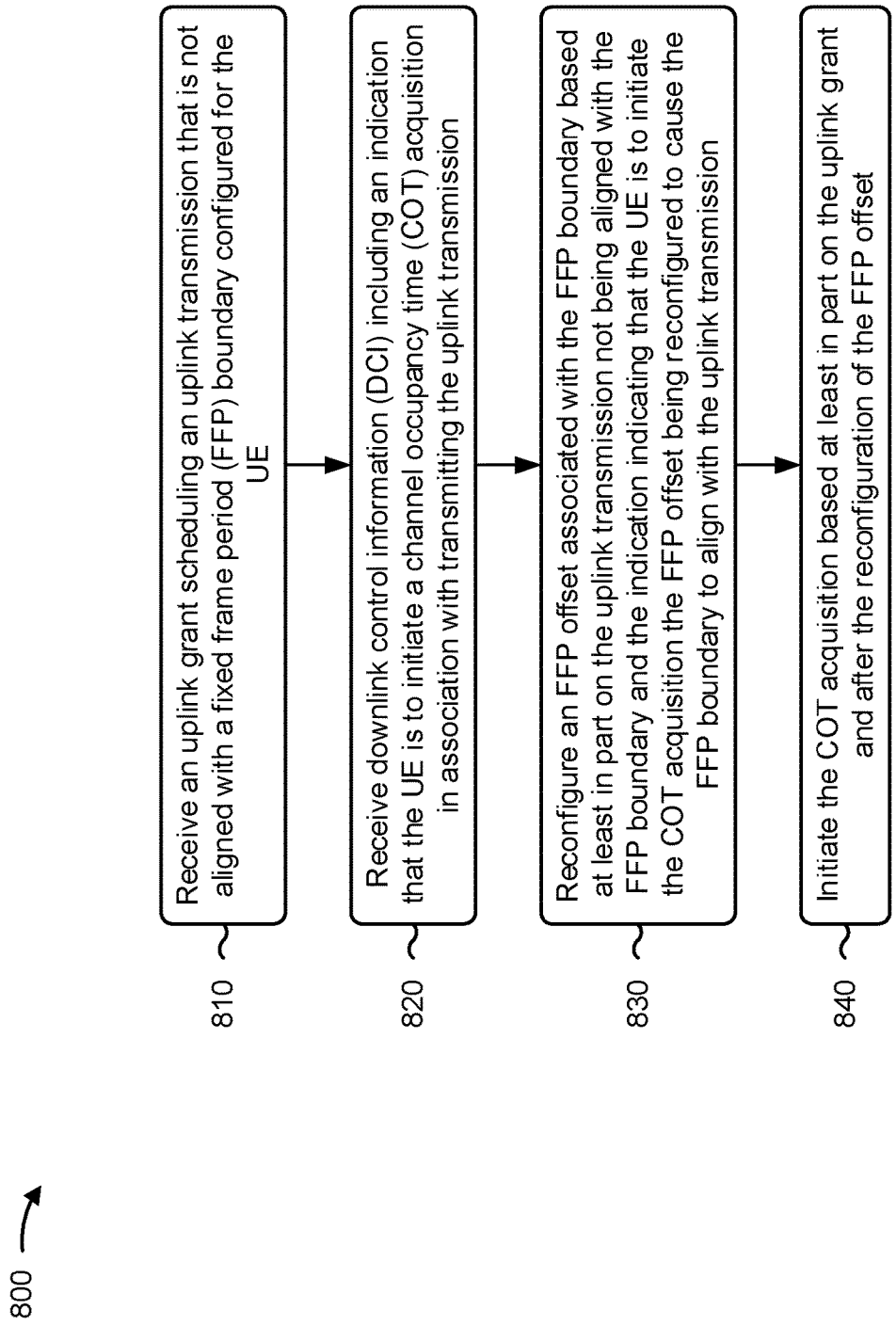

FIG. 8 is a diagram illustrating an example process 800 performed, for example, by a UE, in accordance with various aspects of the present disclosure. Example process 800 is an example where the UE (e.g., UE 120) performs operations associated with techniques for operation when a scheduled uplink transmission is misaligned with a fixed frame period.

As shown in FIG. 8, in some aspects, process 800 may include receiving an uplink grant scheduling an uplink transmission that is not aligned with an FFP boundary configured for the UE (block 810). For example, the UE (e.g., using reception component 1002, depicted in FIG. 10) may receive an uplink grant scheduling an uplink transmission that is not aligned with a fixed frame period (FFP) boundary configured for the UE, as described above.

As further shown in FIG. 8, in some aspects, process 800 may include receiving DCI including an indication that the UE is to initiate a COT acquisition in association with transmitting the uplink transmission (block 820). For example, the UE (e.g., using reception component 1002, depicted in FIG. 10) may receive DCI including an indication that the UE is to initiate a COT acquisition in association with transmitting the uplink transmission, as described above.

As further shown in FIG. 8, in some aspects, process 800 may include reconfiguring an FFP offset associated with the FFP boundary based at least in part on the uplink transmission not being aligned with the FFP boundary and the indication indicating that the UE is to initiate the COT acquisition, the FFP offset being reconfigured to cause the FFP boundary to align with the uplink transmission (block 830). For example, the UE (e.g., using grant processing component 1008, depicted in FIG. 10) may reconfigure an FFP offset associated with the FFP boundary based at least in part on the uplink transmission not being aligned with the FFP boundary and the indication indicating that the UE is to initiate the COT acquisition, the FFP offset being reconfigured to cause the FFP boundary to align with the uplink transmission, as described above.

As further shown in FIG. 8, in some aspects, process 800 may include initiating the COT acquisition based at least in part on the uplink grant and after the reconfiguration of the FFP offset (block 840). For example, the UE (e.g., using grant processing component 1008, depicted in FIG. 10) may initiate the COT acquisition based at least in part on the uplink grant and after the reconfiguration of the FFP offset, as described above.

Process 800 may include additional aspects, such as any single aspect or any combination of aspects described below and/or in connection with one or more other processes described elsewhere herein.

In a first aspect, process 800 includes transmitting the uplink transmission when a result of the COT acquisition is a successful acquisition of a COT.

In a second aspect, alone or in combination with the first aspect, the FFP offset is reconfigured based at least in part on a determination that an amount of time since a configuration of the FFP boundary or a most recent reconfiguration of the FFP offset is greater than or equal to a threshold amount of time.

In a third aspect, alone or in combination with one or more of the first and second aspects, the FFP offset is reconfigured based at least in part on a determination that a result of the reconfiguration would cause the FFP offset to be less than a length of an idle period.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
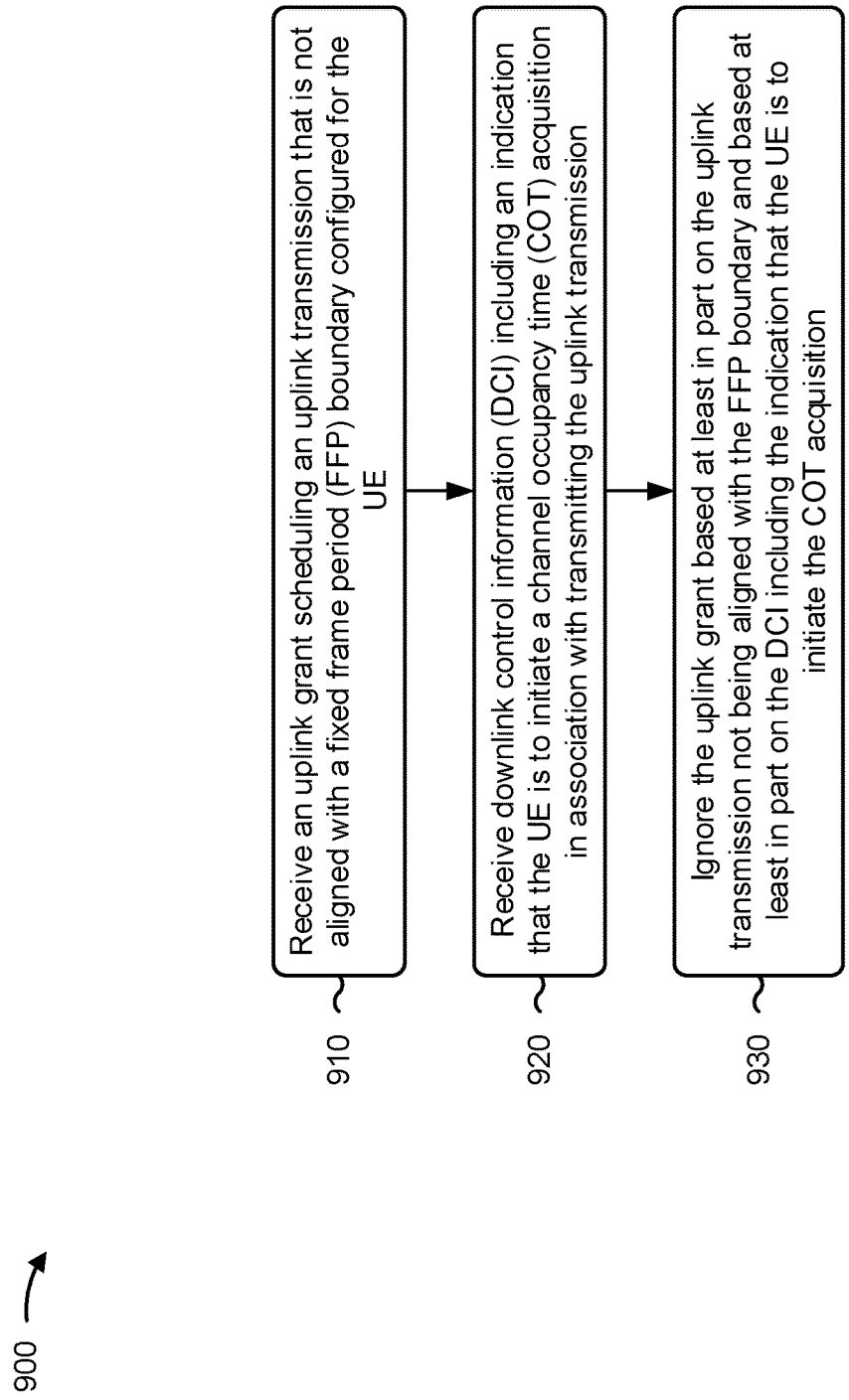

FIG. 9 is a diagram illustrating an example process 900 performed, for example, by an UE, in accordance with various aspects of the present disclosure. Example process 900 is an example where the UE (e.g., UE 120) performs operations associated with techniques for operation when a scheduled uplink transmission is misaligned with a fixed frame period.

As shown in FIG. 9, in some aspects, process 900 may include receiving an uplink grant scheduling an uplink transmission that is not aligned with an FFP boundary configured for the UE (block 910). For example, the UE (e.g., using reception component 1002, depicted in FIG. 10) may receive an uplink grant scheduling an uplink transmission that is not aligned with an FFP boundary configured for the UE, as described above.

As further shown in FIG. 9, in some aspects, process 900 may include receiving DCI including an indication that the UE is to initiate a COT acquisition in association with transmitting the uplink transmission (block 920). For example, the UE (e.g., using reception component 1002, depicted in FIG. 10) may receive DCI including an indication that the UE is to initiate a COT acquisition in association with transmitting the uplink transmission, as described above.

As further shown in FIG. 9, in some aspects, process 900 may include ignoring the uplink grant based at least in part on the uplink transmission not being aligned with the FFP boundary and based at least in part on the DCI including the indication that the UE is to initiate the COT acquisition (block 930). For example, the UE (e.g., using grant processing component 1008, depicted in FIG. 10) may ignore the uplink grant based at least in part on the uplink transmission not being aligned with the FFP boundary and based at least in part on the DCI including the indication that the UE is to initiate the COT acquisition, as described above.

Process 900 may include additional aspects, such as any single aspect or any combination of aspects described below and/or in connection with one or more other processes described elsewhere herein.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
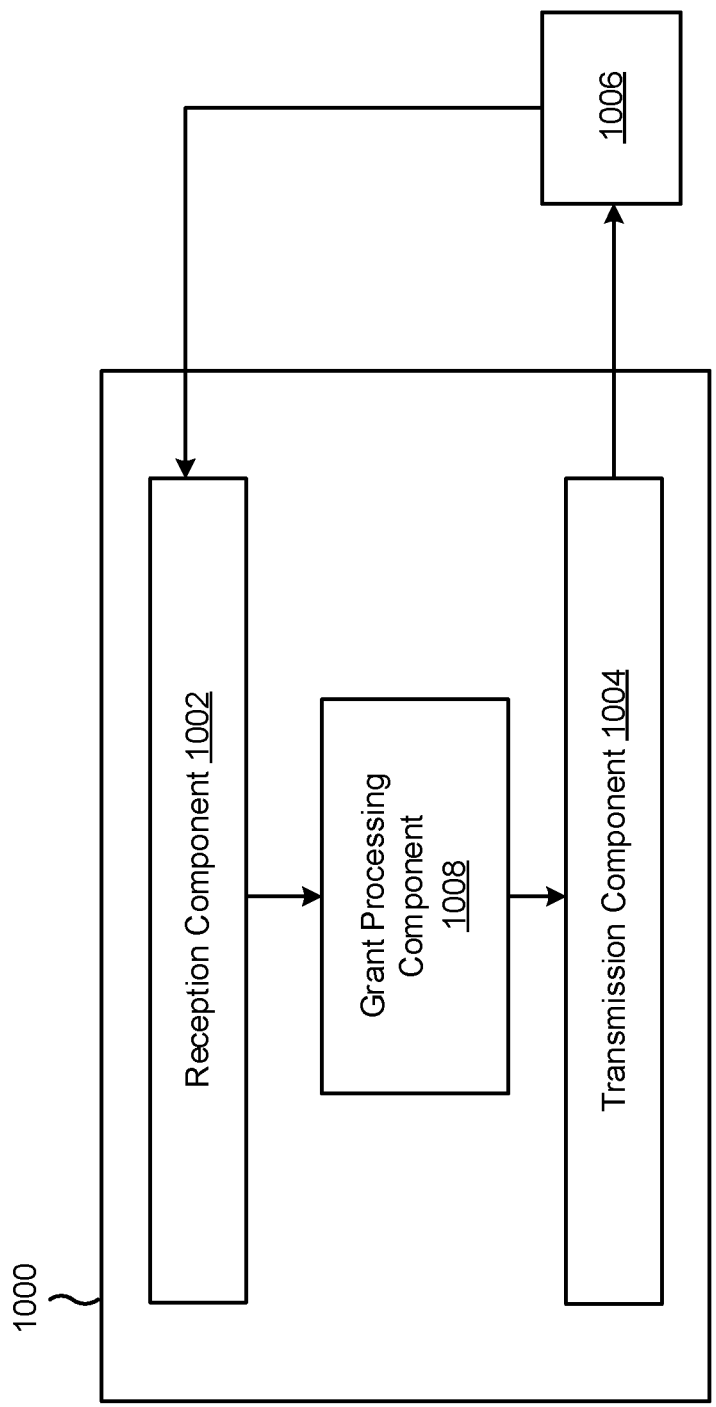
FIGS. 10 and 11 are block diagrams of example apparatuses for wireless communication, in accordance with various aspects of the present disclosure.

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a grant processing component 1008, among other examples.

In some aspects, the apparatus 1000 may be configured to perform one or more operations described herein in connection with FIG. 4, 5A, 5B, or 6. Additionally, or alternatively, the apparatus 1000 may be configured to perform one or more processes described herein, such as process 700 of FIG. 7, process 800 of FIG. 8, process 900 of FIG. 9, or a combination thereof. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

The reception component 1002 may receive an uplink grant scheduling an uplink transmission that is not aligned with an FFP boundary configured for the UE. The reception component 1002 may receive DCI including an indication that the UE is to initiate a COT acquisition in association with transmitting the uplink transmission.

In some aspects, the grant processing component 1008 may modify the indication based at least in part on the uplink transmission not being aligned with the FFP boundary and the indication indicating that the UE is to initiate the COT acquisition. The transmission component 1004 may transmit the uplink transmission based at least in part on the uplink grant and after the modification of the indication. In some aspects, the grant processing component 1008 may perform a listen-before-talk (LBT) procedure prior to the transmission of the uplink transmission.

In some aspects, the grant processing component 1008 may reconfigure an FFP offset associated with the FFP boundary based at least in part on the uplink transmission not being aligned with the FFP boundary and the indication indicating that the UE is to initiate the COT acquisition the FFP offset being reconfigured to cause the FFP boundary to align with the uplink transmission. The grant processing component 1008 may initiate the COT acquisition based at least in part on the uplink grant and after the reconfiguration of the FFP offset. In some aspects, the transmission component 1004 may transmit the uplink transmission when a result of the COT acquisition is a successful acquisition of a COT.

In some aspects, the grant processing component 1008 may ignore the uplink grant based at least in part on the uplink transmission not being aligned with the FFP boundary and based at least in part on the DCI including the indication that the UE is to initiate the COT acquisition.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
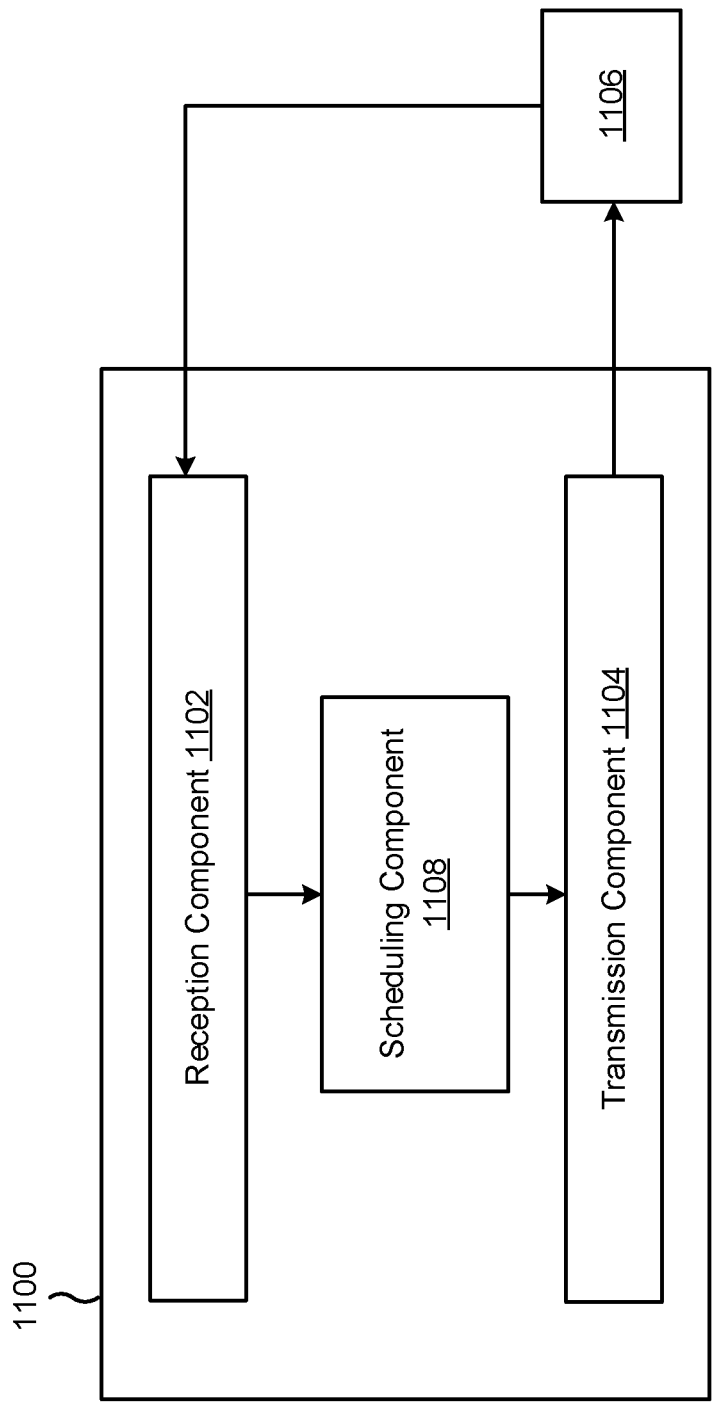

FIG. 11 is a block diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a scheduling component 1108, among other examples.

In some aspects, the apparatus 1100 may be configured to perform one or more operations described herein in connection with FIG. 4, 5A, 5B, or 6. Additionally, or alternatively, the apparatus 1100 may be configured to perform one or more processes described herein. In some aspects, the apparatus 1100 and/or one or more components shown in FIG. 11 may include one or more components of the base station described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the base station described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the base station described above in connection with FIG. 2. In some aspects, the transmission component 1104 may be co-located with the reception component 1102 in a transceiver.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a UE, comprising: receiving an uplink grant scheduling an uplink transmission that is not aligned with an FFP boundary configured for the UE; receiving DCI including an indication that the UE is to initiate a COT acquisition in association with transmitting the uplink transmission; modifying the indication based at least in part on the uplink transmission not being aligned with the FFP boundary and the indication indicating that the UE is to initiate the COT acquisition; and transmitting the uplink transmission based at least in part on the uplink grant and after the modification of the indication.

Aspect 2: The method of Aspect 1, wherein modifying the indication comprises ignoring the indication when the indication is received in a DCI field dedicated to indicating an initiator of the COT acquisition.

Aspect 3: The method of Aspect 2, wherein the indication is ignored based at least in part on a determination that an amount of time since a configuration of the FFP boundary or a most recent reconfiguration of an FFP offset associated with the FFP boundary is less than a threshold amount of time.

Aspect 4: The method of Aspect 1, wherein modifying the indication comprises reinterpreting the indication when the indication is encoded in a value of a DCI field used to identify a set of channel access parameters including an initiator of the COT acquisition.

Aspect 5: The method of Aspect 4, wherein the indication is reinterpreted based at least in part on a determination that an amount of time since a configuration of the FFP boundary or a most recent reconfiguration of an FFP offset associated with the FFP boundary is less than a threshold amount of time.

Aspect 6: The method of any of Aspects 1-5, further comprising performing a listen-before-talk (LBT) procedure prior to the transmission of the uplink transmission.

Aspect 7: A method of wireless communication performed by a UE, comprising: receiving an uplink grant scheduling an uplink transmission that is not aligned with an FFP boundary configured for the UE; receiving DCI including an indication that the UE is to initiate a COT acquisition in association with transmitting the uplink transmission; reconfiguring an FFP offset associated with the FFP boundary based at least in part on the uplink transmission not being aligned with the FFP boundary and the indication indicating that the UE is to initiate the COT acquisition, the FFP offset being reconfigured to cause the FFP boundary to align with the uplink transmission; and initiating the COT acquisition based at least in part on the uplink grant and after the reconfiguration of the FFP offset.

Aspect 8: The method of Aspect 7, further comprising transmitting the uplink transmission when a result of the COT acquisition is a successful acquisition of a COT.

Aspect 9: The method of any of Aspects 7-8, wherein the FFP offset is reconfigured based at least in part on a determination that an amount of time since a configuration of the FFP boundary or a most recent reconfiguration of the FFP offset is greater than or equal to a threshold amount of time.

Aspect 10: The method of any of Aspects 7-9, wherein the FFP offset is reconfigured based at least in part on a determination that a result of the reconfiguration would cause the FFP offset to be less than a length of an idle period.

Aspect 11: A method of wireless communication performed by a UE, comprising: receiving an uplink grant scheduling an uplink transmission that is not aligned with an FFP boundary configured for the UE; receiving DCI including an indication that the UE is to initiate a COT acquisition in association with transmitting the uplink transmission; and ignoring the uplink grant based at least in part on the uplink transmission not being aligned with the FFP boundary and based at least in part on the DCI including the indication that the UE is to initiate the COT acquisition.

Aspect 12: An apparatus for wireless communication at a device, comprising a processor; memory coupled with the processor; and instructions stored in the memory and executable by the processor to cause the apparatus to perform the method of one or more Aspects of Aspects 1-6.

Aspect 13: A device for wireless communication, comprising a memory and one or more processors coupled to the memory, the memory and the one or more processors configured to perform the method of one or more Aspects of Aspects 1-6.

Aspect 14: An apparatus for wireless communication, comprising at least one means for performing the method of one or more Aspects of Aspects 1-6.

Aspect 15: A non-transitory computer-readable medium storing code for wireless communication, the code comprising instructions executable by a processor to perform the method of one or more Aspects of Aspects 1-6.

Aspect 16: A non-transitory computer-readable medium storing a set of instructions for wireless communication, the set of instructions comprising one or more instructions that, when executed by one or more processors of a device, cause the device to perform the method of one or more Aspects of Aspects 1-6.

Aspect 17: An apparatus for wireless communication at a device, comprising a processor; memory coupled with the processor; and instructions stored in the memory and executable by the processor to cause the apparatus to perform the method of one or more Aspects of Aspects 7-10.

Aspect 18: A device for wireless communication, comprising a memory and one or more processors coupled to the memory, the memory and the one or more processors configured to perform the method of one or more Aspects of Aspects 7-10.

Aspect 19: An apparatus for wireless communication, comprising at least one means for performing the method of one or more Aspects of Aspects 7-10.

Aspect 20: A non-transitory computer-readable medium storing code for wireless communication, the code comprising instructions executable by a processor to perform the method of one or more Aspects of Aspects 7-10.

Aspect 21: A non-transitory computer-readable medium storing a set of instructions for wireless communication, the set of instructions comprising one or more instructions that, when executed by one or more processors of a device, cause the device to perform the method of one or more Aspects of Aspects 7-10.

Aspect 22: An apparatus for wireless communication at a device, comprising a processor; memory coupled with the processor; and instructions stored in the memory and executable by the processor to cause the apparatus to perform the method of Aspect 11.

Aspect 23: A device for wireless communication, comprising a memory and one or more processors coupled to the memory, the memory and the one or more processors configured to perform the method of Aspect 11.

Aspect 24: An apparatus for wireless communication, comprising at least one means for performing the method of Aspect 11.

Aspect 25: A non-transitory computer-readable medium storing code for wireless communication, the code comprising instructions executable by a processor to perform the method of Aspect 11.

Aspect 26: A non-transitory computer-readable medium storing a set of instructions for wireless communication, the set of instructions comprising one or more instructions that, when executed by one or more processors of a device, cause the device to perform the method of Aspect 11.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
receiving an uplink grant scheduling an uplink transmission that is not aligned with a fixed frame period (FFP) boundary configured for the UE;
receiving downlink control information (DCI) including an indication that the UE is to initiate a channel occupancy time (COT) acquisition in association with transmitting the uplink transmission;
modifying the indication based at least in part on the uplink transmission not being aligned with the FFP boundary and the indication indicating that the UE is to initiate the COT acquisition; and
transmitting the uplink transmission based at least in part on the uplink grant and after the modification of the indication.

2. The method of claim 1, wherein modifying the indication comprises ignoring the indication when the indication is received in a DCI field dedicated to indicating an initiator of the COT acquisition.

3. The method of claim 2, wherein the indication is ignored based at least in part on a determination that an amount of time since a configuration of the FFP boundary or a most recent reconfiguration of an FFP offset associated with the FFP boundary is less than a threshold amount of time.

4. The method of claim 1, wherein modifying the indication comprises reinterpreting the indication when the indication is encoded in a value of a DCI field used to identify a set of channel access parameters including an initiator of the COT acquisition.

5. The method of claim 4, wherein the indication is reinterpreted based at least in part on a determination that an amount of time since a configuration of the FFP boundary or a most recent reconfiguration of an FFP offset associated with the FFP boundary is less than a threshold amount of time.

6. The method of claim 1, further comprising performing a listen-before-talk (LBT) procedure prior to the transmission of the uplink transmission.

7. A method of wireless communication performed by a user equipment (UE), comprising:
receiving an uplink grant scheduling an uplink transmission that is not aligned with a fixed frame period (FFP) boundary configured for the UE;
receiving downlink control information (DCI) including an indication that the UE is to initiate a channel occupancy time (COT) acquisition in association with transmitting the uplink transmission;
reconfiguring an FFP offset associated with the FFP boundary based at least in part on the uplink transmission not being aligned with the FFP boundary and the indication indicating that the UE is to initiate the COT acquisition,
the FFP offset being reconfigured to cause the FFP boundary to align with the uplink transmission; and
initiating the COT acquisition based at least in part on the uplink grant and after the reconfiguration of the FFP offset.

8. The method of claim 7, further comprising transmitting the uplink transmission when a result of the COT acquisition is a successful acquisition of a COT.

9. The method of claim 7, wherein the FFP offset is reconfigured based at least in part on a determination that an amount of time since a configuration of the FFP boundary or a most recent reconfiguration of the FFP offset is greater than or equal to a threshold amount of time.

10. The method of claim 7, wherein the FFP offset is reconfigured based at least in part on a determination that a result of the reconfiguration would cause the FFP offset to be less than a length of an idle period.

11. A method of wireless communication performed by a user equipment (UE), comprising:
receiving an uplink grant scheduling an uplink transmission that is not aligned with a fixed frame period (FFP) boundary configured for the UE;
receiving downlink control information (DCI) including an indication that the UE is to initiate a channel occupancy time (COT) acquisition in association with transmitting the uplink transmission; and ignoring the uplink grant based at least in part on the uplink transmission not being aligned with the FFP boundary and based at least in part on the DCI including the indication that the UE is to initiate the COT acquisition.

12. A user equipment (UE) for wireless communication, comprising:
a memory; and
one or more processors coupled to the memory, the memory and the one or more processors configured to:
receive an uplink grant scheduling an uplink transmission that is not aligned with a fixed frame period (FFP) boundary configured for the UE;
receive downlink control information (DCI) including an indication that the UE is to initiate a channel occupancy time (COT) acquisition in association with transmitting the uplink transmission;
modify the indication based at least in part on the uplink transmission not being aligned with the FFP boundary and the indication indicating that the UE is to initiate the COT acquisition; and
transmit the uplink transmission based at least in part on the uplink grant and after the modification of the indication.

13. The UE of claim 12, wherein the one or more processors, when modifying the indication, are configured to ignore the indication when the indication is received in a DCI field dedicated to indicating an initiator of the COT acquisition.

14. The UE of claim 13, wherein the indication is ignored based at least in part on a determination that an amount of time since a configuration of the FFP boundary or a most recent reconfiguration of an FFP offset associated with the FFP boundary is less than a threshold amount of time.

15. The UE of claim 12, wherein the one or more processors, when modifying the indication, are configured to reinterpret the indication when the indication is encoded in a value of a DCI field used to identify a set of channel access parameters including an initiator of the COT acquisition.

16. The UE of claim 15, wherein the indication is reinterpreted based at least in part on a determination that an amount of time since a configuration of the FFP boundary or a most recent reconfiguration of an FFP offset associated with the FFP boundary is less than a threshold amount of time.

17. The UE of claim 12, wherein the one or more processors are further configured to perform a listen-before-talk (LBT) procedure prior to the transmission of the uplink transmission.

* * * * *